United States Patent
Ogatsu et al.

(10) Patent No.: US 12,347,232 B2
(45) Date of Patent: Jul. 1, 2025

(54) IMAGING APPARATUS FOR AUTHENTICATION AND AUTHENTICATION SYSTEM

(71) Applicants: NEC Corporation, Tokyo (JP); NEC Platforms, Ltd., Kawasaki (JP)

(72) Inventors: Toshinobu Ogatsu, Tokyo (JP); Ryoma Oami, Tokyo (JP); Toshiyuki Sashihara, Tokyo (JP); Takamichi Miyamoto, Tokyo (JP); Ryuichi Akashi, Tokyo (JP); Ryo Yamakabe, Tokyo (JP); Daisuke Shimada, Kanagawa (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 590 days.

(21) Appl. No.: 17/772,591

(22) PCT Filed: Nov. 5, 2019

(86) PCT No.: PCT/JP2019/043277
§ 371 (c)(1),
(2) Date: Apr. 28, 2022

(87) PCT Pub. No.: WO2021/090364
PCT Pub. Date: May 14, 2021

(65) Prior Publication Data
US 2022/0383658 A1   Dec. 1, 2022

(51) Int. Cl.
*G06V 40/16*   (2022.01)
*G06F 21/32*   (2013.01)
(Continued)

(52) U.S. Cl.
CPC ............ *G06V 40/172* (2022.01); *G06F 21/32* (2013.01); *G06V 10/141* (2022.01); *G06V 40/197* (2022.01)

(58) Field of Classification Search
CPC .. G06V 40/172; G06V 10/141; G06V 40/197; G06V 10/12; G06V 10/147; G06V 40/70; G06V 40/19; G06F 21/32
(Continued)

(56) References Cited

U.S. PATENT DOCUMENTS 10,169,651 B2 *  1/2019  Gu ......................... H04N 23/57
10,204,266 B2 *  2/2019  Lee ........................ G06V 40/19
(Continued)

FOREIGN PATENT DOCUMENTS

CN   103152517 A   6/2013
EP      1465104 A  10/2004
(Continued)

OTHER PUBLICATIONS

International Search Report for PCT Application No. PCT/JP2019/043277, mailed on Feb. 4, 2020.
(Continued)

*Primary Examiner* — Neil R McLean

(57) ABSTRACT

An imaging apparatus for authentication includes: a first imaging unit that obtains a first image used in a first authentication process by imaging a target person; a second imaging unit that obtains a second image used in a second image process by imaging the target person in an imaging range narrower than that of the first imaging unit; a drive unit that integrally drives the first imaging unit and the second imaging unit; and a drive control unit that controls the drive unit on the basis of the first image.

11 Claims, 11 Drawing Sheets

(51) Int. Cl.
*G06V 10/141* (2022.01)
*G06V 40/18* (2022.01)

(58) Field of Classification Search
USPC .......................................................... 382/116
See application file for complete search history.

(56) References Cited

U.S. PATENT DOCUMENTS

| | | |
|---|---|---|
| 2002/0191075 A1 | 12/2002 | Doi et al. |
| 2004/0202353 A1* | 10/2004 | Doi .................. G08B 13/19695 382/115 |
| 2005/0084137 A1 | 4/2005 | Kim et al. |
| 2009/0016574 A1 | 1/2009 | Tsukahara |
| 2009/0237208 A1 | 9/2009 | Tsukahara et al. |
| 2010/0079243 A1 | 4/2010 | Hamada |
| 2016/0092720 A1 | 3/2016 | Lee et al. |
| 2017/0243063 A1 | 8/2017 | Kaneko et al. |
| 2018/0012006 A1 | 1/2018 | Suh et al. |
| 2020/0311238 A1 | 10/2020 | Ackerman et al. |

FOREIGN PATENT DOCUMENTS

| | | |
|---|---|---|
| EP | 2005888 A2 | 12/2008 |
| JP | 2000-023946 A | 1/2000 |
| JP | 2002-122899 A | 4/2002 |
| JP | 2007-319174 A | 12/2007 |
| JP | 2009-237643 A | 10/2009 |
| JP | 2017-151556 A | 8/2017 |
| JP | 2018-010625 A | 1/2018 |
| WO | 03/060814 A1 | 7/2003 |
| WO | 2006/088042 A1 | 8/2006 |
| WO | 2019/118716 A1 | 6/2019 |

OTHER PUBLICATIONS

European Search Report for EP Application No. 19951310.2, dated on Sep. 27, 2022.
IN Office Action for IN Application No. 202247025965, mailed on Sep. 9, 2022.

* cited by examiner

IMAGING APPARATUS FOR AUTHENTICATION AND AUTHENTICATION SYSTEM

This application is a National Stage Entry of PCT/JP2019/043277 filed on Nov. 5, 2019, the contents of all of which are incorporated herein by reference, in their entirety.

TECHNICAL FIELD

The present invention relates to an imaging apparatus for authentication that images a target person to perform an authentication process, and an authentication system that performs the authentication process by using a captured image.

BACKGROUND ART

As an example of an authentication apparatus that is configured to authenticate a target person such as a person or a man, an authentication apparatus that performs an authentication process using a plurality of biometric information (i.e., a complex biometric authentication or a multimodal biometric authentication) is known. For example, Patent Literature 1 discloses a technique/technology in which outputs from a plurality of biometric authentication devices are combined to perform an authentication process. Patent Literature 2 discloses a technique/technology in which weighting addition is performed on authentication degrees of two authentication methods, and identity verification is performed on the basis of the resulting authentication degree.

CITATION LIST

Patent Literature

Patent Literature 1: JP2018-10625A
Patent Literature 2: JP2009-237643A

SUMMARY

Technical Problem

The complex biometric authentication requires that a plurality of biometric information be obtained individually. Therefore, for example, a time required for authentication becomes long, or a terminal for authentication (specifically, a terminal that captures an image used in the authentication process) becomes large, which is technically technical problematic.

The present invention has been made in view of the above problems, and it is an example object of the present invention to provide an imaging apparatus for authentication and an authentication system that allow a complex biometric authentication using a plurality of biometric information to be appropriately performed.

Solution to Problem

An imaging apparatus for authentication according to an example aspect of the present invention includes: a first imaging unit that obtains a first image used in a first authentication process by imaging a target person; a second imaging unit that obtains a second image used in a second image process by imaging the target person in an imaging range narrower than that of the first imaging unit; a drive unit that integrally drives the first imaging unit and the second imaging unit; and a drive control unit that controls the drive unit on the basis of the first image.

An authentication system according to an example aspect of the present invention includes: a first imaging unit that obtains a first image used in a first authentication process by imaging a target person; a second imaging unit that obtains a second image used in a second image process by imaging the target person in an imaging range narrower than that of the first imaging unit; a drive unit that integrally drives the first imaging unit and the second imaging unit; a drive control unit that controls the drive unit on the basis of the first image; a first processing unit that performs the first authentication process by obtaining the first image; a second processing unit that performs the second authentication process by obtaining the second image; and an output unit that outputs an authentication result of the target person on the basis of a processing result of the first processing unit and the second processing unit.

Effect of the Invention

According to the imaging apparatus for authentication and the authentication system in the respective aspects described above, it is possible to appropriately perform a complex biometric authentication using a plurality of biometric information.

DESCRIPTION OF EXAMPLE EMBODIMENT

Hereinafter, an imaging apparatus for authentication and an authentication system according to an example embodiment will be described with reference to the drawings.

<Imaging Apparatus for Authentication>

First, an imaging apparatus for authentication according to the example embodiment will be described with reference to FIG. 1 to FIG. 8.

(Apparatus Configuration)

Figure 1:
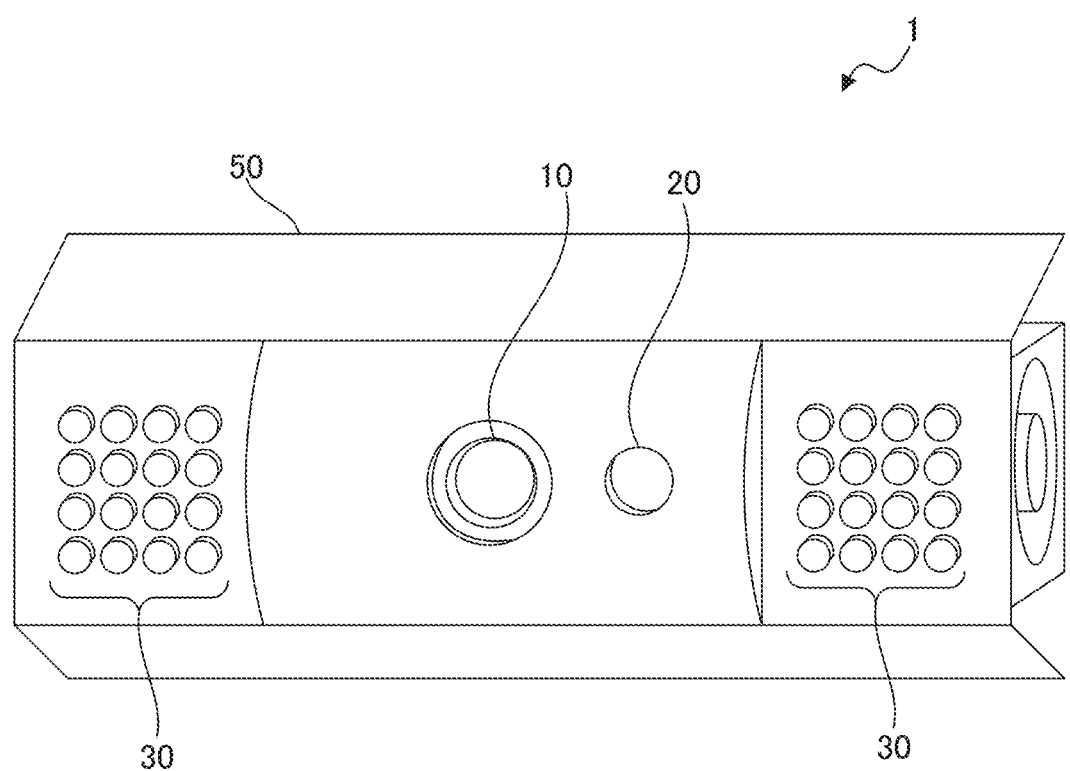
FIG. 1 is version 1 of a schematic diagram illustrating a configuration of an imaging apparatus for authentication according to an example embodiment.
Figure 2:
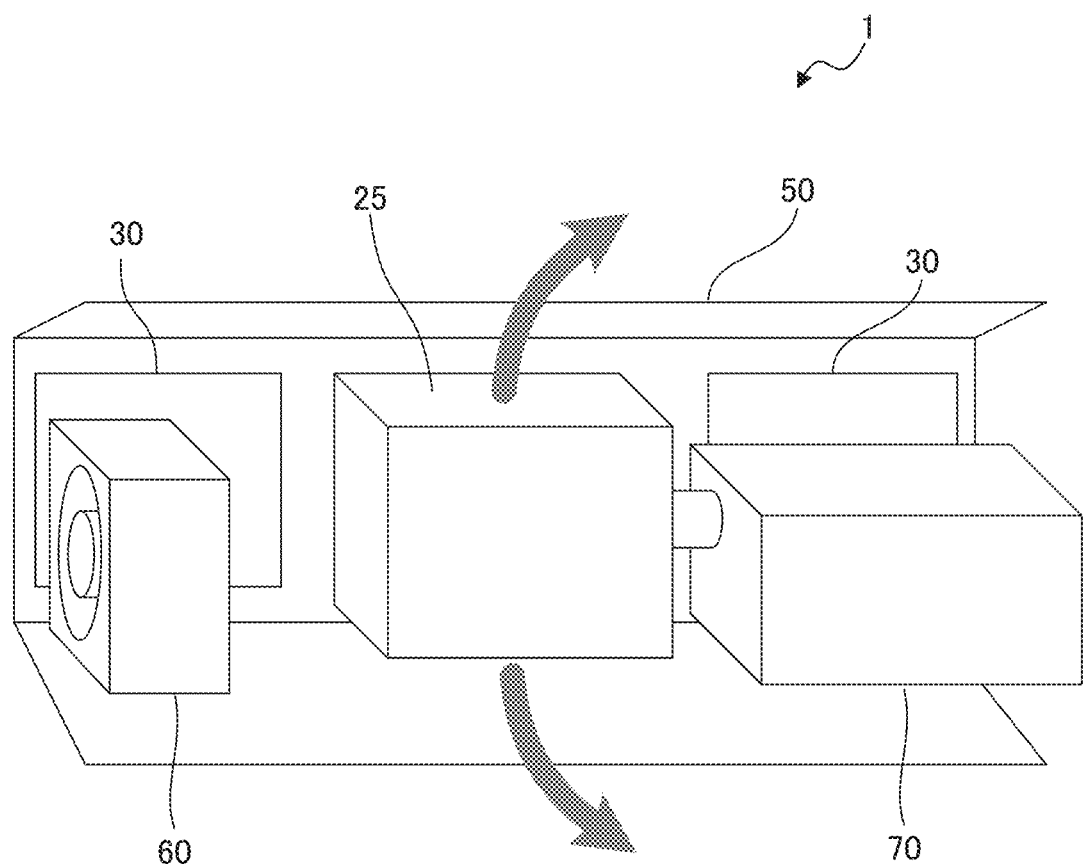
FIG. 2 is version 2 of a schematic diagram illustrating the configuration of the imaging apparatus for authentication according to the example embodiment.
Figure 3:
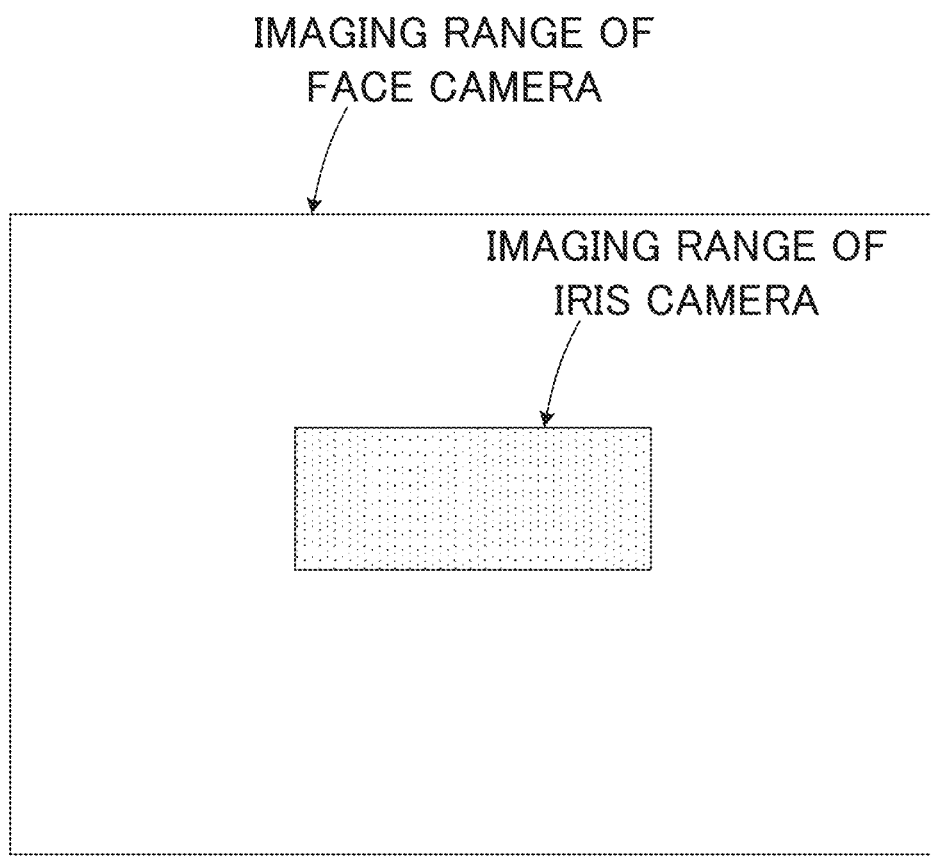
FIG. 3 is a plan view illustrating a relation between an imaging range of a face camera and an imaging range of an iris camera.
Figure 4:
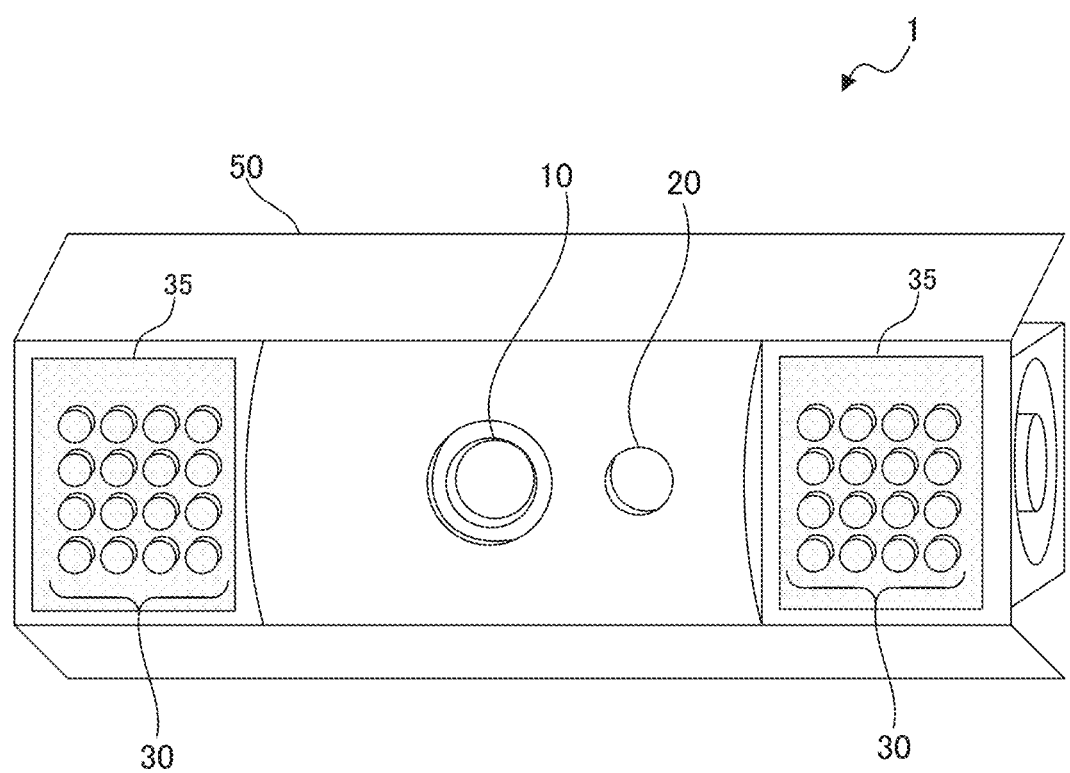
FIG. 4 is a schematic diagram illustrating an example of a visible light filter provided in a lighting unit.
Figure 5:
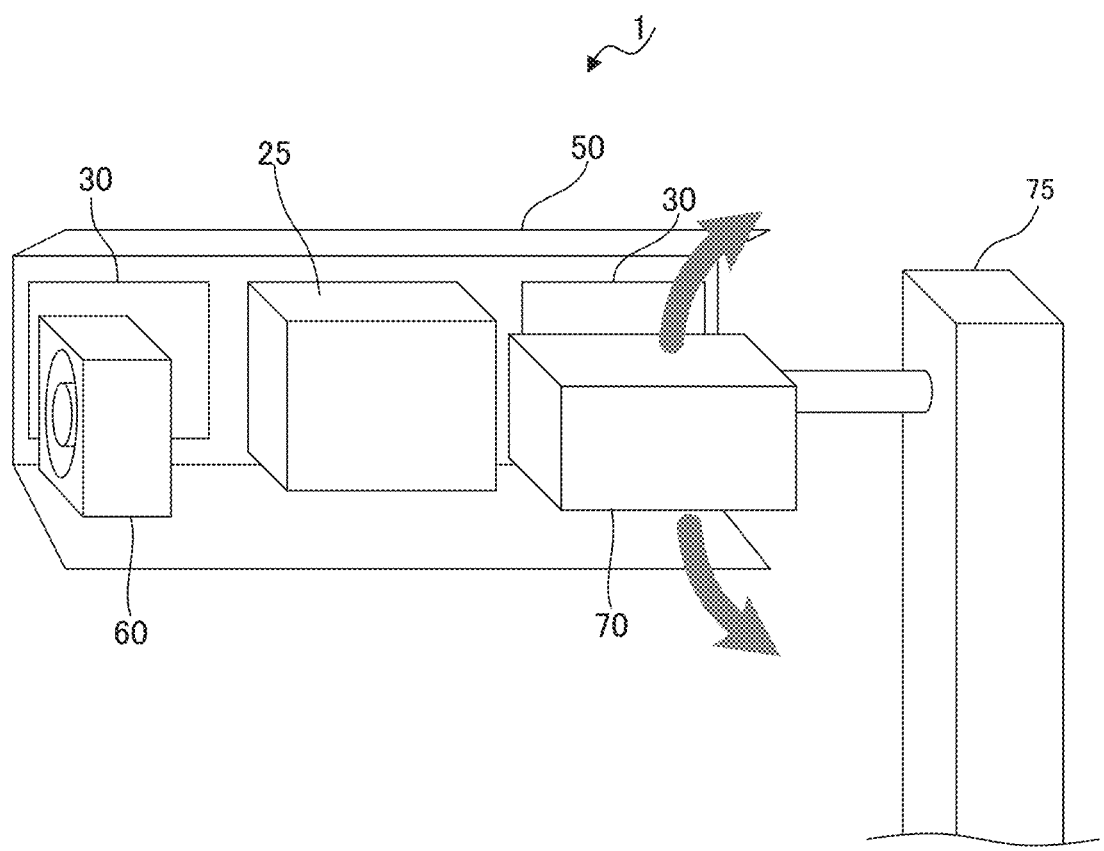
FIG. 5 is a schematic diagram illustrating a configuration in which a motor is fixed to a fixed part outside the apparatus.
Figure 6:
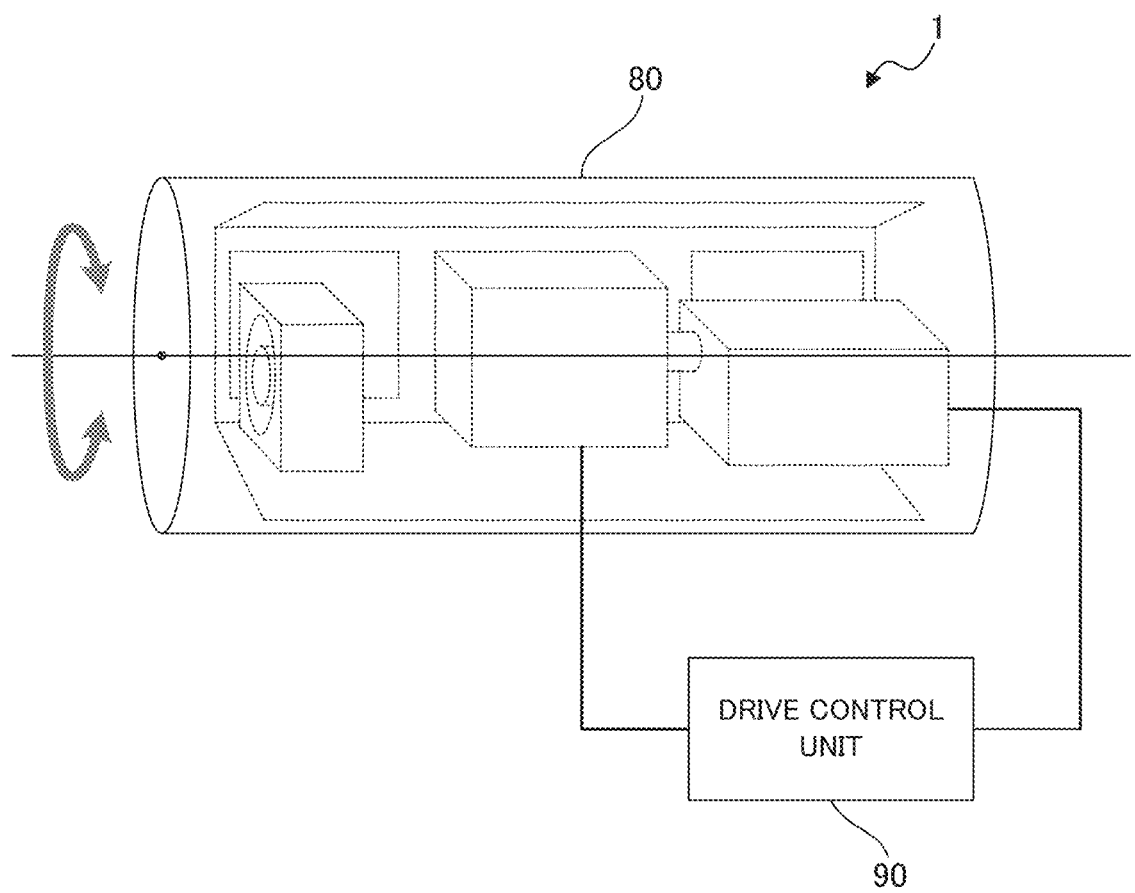
FIG. 6 is a conceptual diagram illustrating a driving direction of the imaging apparatus for authentication according to the example embodiment.

A configuration of the imaging apparatus for authentication according to the example embodiment will be described with reference to FIG. 1 to FIG. 6. FIG. 1 is version 1 of a schematic diagram illustrating the configuration of the imaging apparatus for authentication according to the example embodiment. FIG. 2 is version 2 of a schematic diagram illustrating the configuration of the imaging apparatus for authentication according to the example embodiment. FIG. 3 is a plan view illustrating a relation between an imaging range of a face camera and an imaging range of an iris camera. FIG. 4 is a schematic diagram illustrating an example of a visible light filter provided in a lighting unit. FIG. 5 is a schematic diagram illustrating a configuration in which a motor is fixed to a fixed part outside the apparatus. FIG. 6 is a conceptual diagram illustrating a driving direction of the imaging apparatus for authentication according to the example embodiment. Incidentally, for convenience of explanation, FIG. 1 to FIG. 6 illustrates only main components, and do not illustrate components that are less related to the example embodiment. FIG. 1 is a view of the imaging apparatus for authentication from a front side (in other words, from an imaging target person side), and FIG. 2 is a view of the imaging apparatus for authentication from a rear side (i.e., from a side opposite to FIG. 1).

As illustrated in FIG. 1 and FIG. 2, an imaging apparatus 1 for authentication according to the example embodiment includes a face camera 10, an iris camera 20, a lighting unit 30, a holding part 50, an air cooling fan 60, and a motor 70.

The face camera 10 is configured as a visible light camera for capturing a face image used for face authentication. The iris camera 20 is configured as a near-infrared camera for capturing an iris image used for iris authentication, and has an imaging range (also referred to as a field of view) that is narrower than that of the face camera 10. The face camera 10 and the iris camera 20 are arranged such that their imaging ranges overlap each other, for example, such that the imaging range of the iris camera 20 is positioned near the center of the imaging range of the face camera 10 (see FIG. 3). The face camera 10 and the iris camera 20 are integrally configured as a camera unit 25. The face camera 10 and the iris camera 20 are fixed to the holding part 50 and may be integrally driven by a motor 70 described later.

The lighting unit 30 is configured to emit illumination light (i.e., near-infrared light) for assisting the imaging of the iris camera 20. Incidentally, the lighting unit 30 may be provided with a visible light filter that transmits the illumination light (i.e., near-infrared light) but has a low visible light transmittance. The visible light filter is provided so as to cover at least a part (desirably a whole) of a light source of the lighting unit 30 (see FIG. 4). In this case, it is possible to reduce the visible light that passes to the outside of the imaging apparatus 1 for authentication (in other words, the imaging target person side), from the lighting unit 30 side. Consequently, it is possible to make it difficult to recognize the presence of the lighting unit 30 from the outside of the imaging apparatus 1 for authentication. The lighting unit 30 is fixed to the holding part 50 together with the face camera 10 and the iris camera 20, and can be integrally driven with the face camera 10 and the iris camera 20 by the motor 70 described later.

The air cooling fan 60 is a fan for air-blowing in order to cool the imaging apparatus 1 for authentication. The air cooling fan 60 may be or may not be fixed to the holding part 50. In other words, the air cooling fan 60 may be configured to be integrally driven with the face camera 10, the iris camera 20, and the lighting unit 30, or not to be integrally driven (in this case, the air cooling fan 60 may be fixed to a fixing member (e.g., a member outside the apparatus) other than the holding part 50).

The motor 70 is coupled to the camera unit 25 (in other words, the face camera 10 and the iris camera 20) and is allowed to integrally drive the orientation of each of the face camera 10, the iris camera 20, and the lighting unit 30 in a vertical direction (see arrows in FIG. 2). Specifically, when the motor 70 is driven, the face camera 10 and the iris camera 20 are driven to rotate coaxially, and the imaging ranges of the face camera 10 and the iris camera 20 are changed by the same angle in the vertical direction. A driving direction of the motor 70 here is merely an example, and the face camera 10, the iris camera 20, and the lighting unit 30 may be driven in a direction other than the vertical direction. Furthermore, more complex movements may be realized by that the motor 70 has a plurality of drive shafts.

The motor 70 may or may not be fixed to the holding part 50. When the motor 70 is not fixed to the holding part 50, the motor 70 itself does not move even when the motor 70 is driven, and the face camera 10, the iris camera 20, and the illuminating portion 30 fixed to the holding part 50 move. In this case, the motor 70 may be fixed, for example, to a housing 80 or the like. On the other hand, when the motor 70 is fixed to the holding part 50, the motor 70 itself also moves together with the face camera 10, the iris camera 20, and the lighting unit 30 fixed to the holding part 50 (in this case, the drive shaft of the motor may be connected to the outside of the apparatus). In this case, the drive shaft of the motor 70 may be fixed, for example, to a fixing part 75 outside the apparatus (see FIG. 5).

As illustrated in FIG. 2, the face camera 10, the iris camera 20, the lighting unit 30, the holding part 50, the air cooling fan 60, and the motor 70 are disposed inside the cylindrical housing 80. In particular, as illustrated in FIG. 6, the driving by the motor 70 is a rotation operation in which a central axis of the housing 80 (i.e., a central axis of the cylindrical) us a rotation axis. In this manner, the face camera 10 and the iris camera 20 can be smoothly driven in the housing 80. Even if the motor 70 is driven, only the face camera 10 and the iris camera 20 in the housing 80 move, but the housing 80 itself does not move. This configuration is realized, for example, by a tilt mechanism. In this way, it is possible to make it difficult for the imaging target person to recognize the movement inside the housing 80.

At least a part of the housing 80 (specifically, a part covering the face camera 10 and the iris camera 20) may be formed of a material with a high transmittance to light from the outside and a low transmittance to light from the inside. Specifically, the housing 80 may be configured, for example, as a half mirror or a smoke mirror. As described above, at least a part of the housing 80 functions as a cover unit that adjusts the transmittance, by which it is possible to make it difficult to recognize the movements of the face camera 10 or the iris camera 20 from the outside without deteriorating the image quality of a captured image.

The driving of the motor 70 is controlled by a drive control unit 90. The drive control unit 90 calculates a drive amount of the motor 70 (in other words, a moving amount of the imaging ranges of the face camera 10 and the iris camera 20) to control the driving of the motor 70. A specific method of controlling the motor 70 by the drive control unit 90 will be described in detail later. The drive control unit 90 may be provided outside the housing 80 or inside the housing 80.

(Operation in Imaging)

Figure 7:
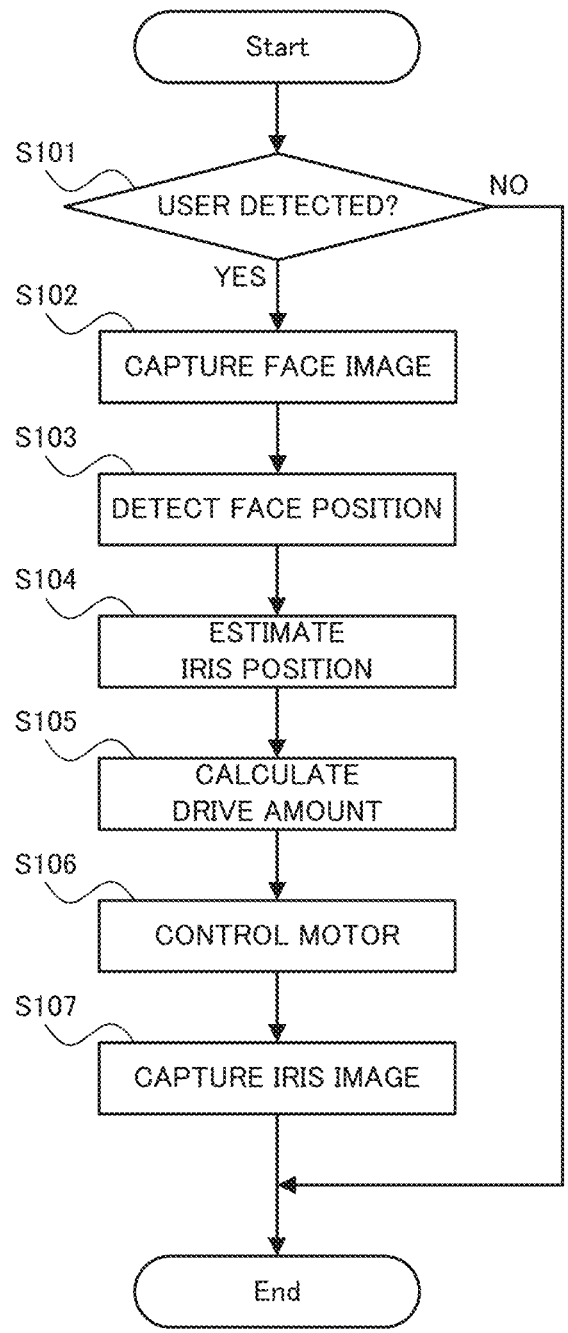
FIG. 7 is a flowchart illustrating a flow of operation of the imaging apparatus for authentication according to the example embodiment.
Figure 8A:
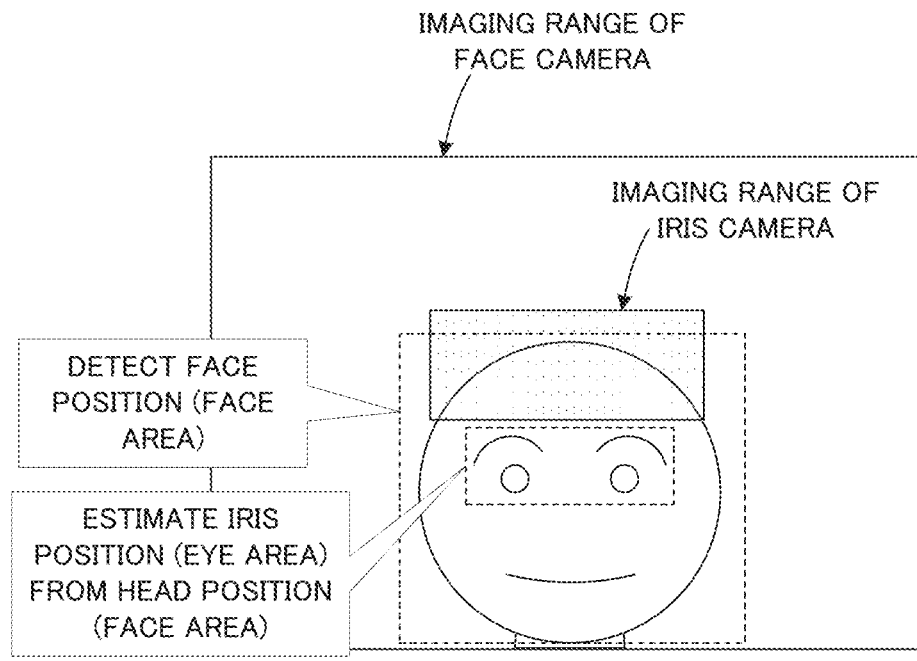
FIG. 8A and FIG. 8B are conceptual diagrams illustrating an example of a method of adjusting an imaging range on the basis of a face position.
Figure 8B:
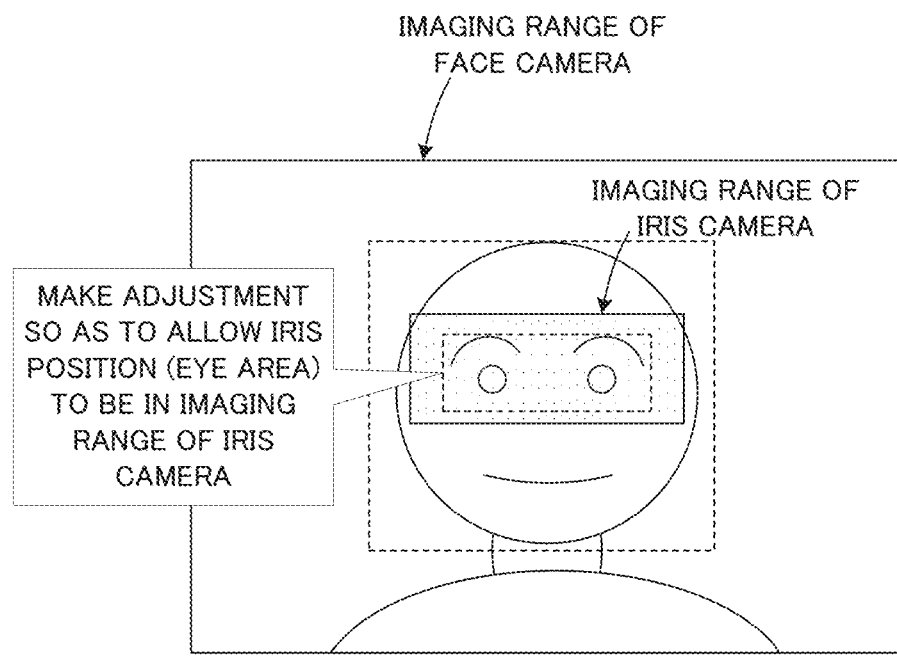

Next, a flow of operation of the imaging apparatus 1 for authentication according to the example embodiment will be described with reference to FIG. 7 to FIG. 8B. FIG. 7 is a flowchart illustrating the flow of the operation of the imaging apparatus for authentication according to the example embodiment. FIG. 8A and FIG. 8B are conceptual diagrams illustrating an example of a method of adjusting the imaging range on the basis of a face position.

As illustrated in FIG. 7, in operation of the imaging apparatus 1 for authentication according to the example embodiment, the face camera 10 firstly detects whether or not there is a user who is an imaging target person (step S101). The presence of a user may be detected, for example, by a not-illustrated sensor or the like, or may be detected by the face camera 10 itself. Alternatively, the presence of a user may be detected when the user operates the apparatus. When no user is detected (the step S101: NO), the subsequent processing is omitted, and a series of steps is ended. In this case, the step S101 may be performed again after a lapse of a predetermined period.

When a user is detected (the step S101: YES), the face camera 10 captures the face image of the user (step S102). Although the position of the user's face varies depending on the height and standing position of the user, it is possible to capture the face image of the user without particularly adjusting the imaging range because the imaging range of the face camera 10 is relatively widely set. If the face image cannot be normally captured even though a user is detected, a not-illustrated display unit or the like may be used to guide the user into the imaging range. Alternatively, even if the entire face is not imaged, if the entire face is partially imaged (i.e., if the face position can be detected from the face image), as described later, the drive control unit 90 changes the imaging range of the iris camera 20, and then, the face camera 10 may capture the face image again.

When the face image is captured by the face camera 10, the drive control unit 90 obtains the face image from the face camera 10, and detects the face position (also referred to as a face area) of the user from the face image (step S103). That is, it detects at which position of the imaging range of the face camera 10 the face of the user is. A detailed description of a specific method of detecting the face position will be omitted here because the existing method can be appropriately adopted thereto.

Subsequently, the drive control unit 90 estimates an iris position (also referred to as an eye area) of the user on the basis of the detected face position of the user (step S104). The estimate here can be realized, for example, by storing in advance a relationship between the face position of the user and the iris position. For example, the drive control unit 90 estimates that the eye area is near the center of the detected face area (see FIG. 8A). When the iris position of the user is estimated, the drive control unit 90 calculates the drive amount of the motor 70 so as to allow the user's iris to be within the imaging range of the iris camera 20 (step S105). In other words, it is calculated to what extent the imaging range of the iris camera 20 is to be moved to allow the user's iris to be within the imaging range of the iris camera 20.

Subsequently, the drive control unit 90 controls the driving of the motor 70 on the basis of the drive amount of the calculated motor 70 (step S106). This changes the imaging range of the iris camera 20 so that the iris camera 20 can reliably capture the iris image of the user. More specifically, the estimated eye area falls within the imaging range of the iris camera 20 (see FIG. 8B). Then, in that state, the iris camera 20 captures the iris image of user (step S107). Since the lighting unit 30 is also driven together with the iris camera 20 (i.e., an irradiation position also moves in accordance with the imaging range of the iris camera 20), it is possible to capture the iris image with a better image quality.

After the drive control unit 90 changes the imaging range of the iris camera 20, the face camera 10 may capture the face image again. Since the iris camera 20 is driven integrally with the face camera 10, if the imaging range of the iris camera 20 is changed, the imaging range of the face camera 10 is also changed to a more appropriate position. Therefore, by capturing the face image again in this timing, it is possible to capture the face image of the user, more appropriately. In this way, for example, even if the face image captured in the step S102 is an image that cannot be used for the face authentication (e.g., an image in which only a part of the face is captured, etc.), a face authentication unit 210 of an authentication processing unit 200 (see FIG. 9) is allowed to perform the face authentication by using the face image captured by the face camera 10 after the adjustment.

<Authentication System>

Next, an authentication system including the imaging apparatus 1 for authentication described above will be described with reference to FIG. 9 to FIG. 11.

(System Configuration)

Figure 9:
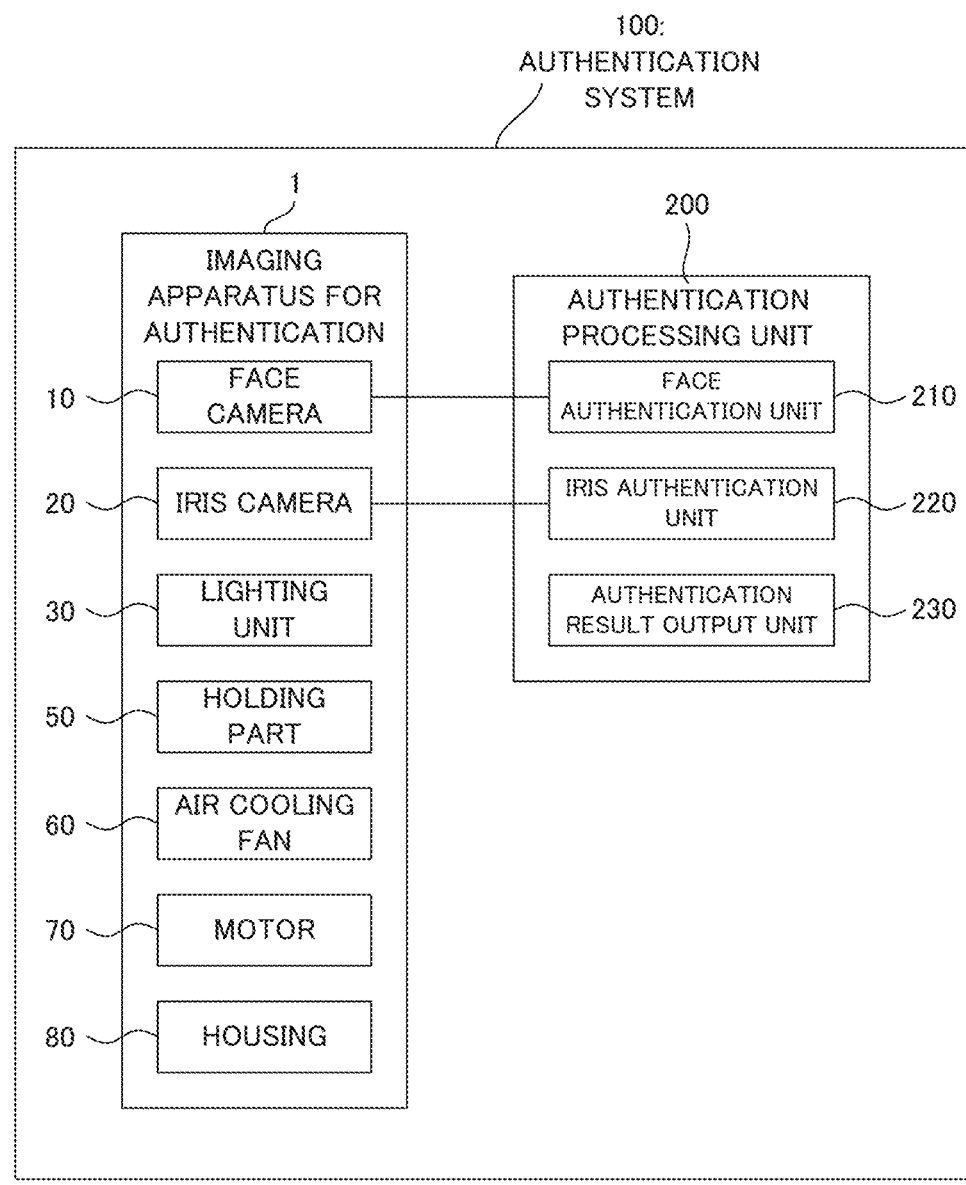
FIG. 9 is a block diagram illustrating an overall configuration of an authentication system according to the example embodiment.

An overall configuration of an authentication system according to the example embodiment will be described with reference to FIG. 9. FIG. 9 is a block diagram illustrating the overall configuration of the authentication system according to the example embodiment.

As illustrated in FIG. 9, an authentication system 100 according to the example embodiment is configured as a complex authentication system that is configured to perform two authentication processes, which are the face authentication and the iris authentication. The authentication system 100 includes the imaging apparatus 1 for authentication described above and an authentication processing unit 200.

The authentication processing unit 200 is configured as, for example, a server or a cloud or the like. The authentication processing unit 200 includes a face authentication unit 210, an iris authentication unit 220, and an authentication result output unit 230, as a functional block for realizing the function.

The face authentication unit 210 is configured to perform the face authentication by using the face image (or a feature quantity extracted from the face image) captured by the face camera 10 in the imaging apparatus 1 for authentication. Incidentally, a detailed description of the face authentication will be omitted here because the existing method can be appropriately adopted thereto. A process result of the face authentication unit 210 is configured to be outputted to the authentication result output unit 230.

The iris authentication unit 220 is configured to perform the iris authentication by using the iris image (or a feature quantity extracted from the iris image) captured by the iris camera 20 in the iris imaging apparatus 1 for authentication. Incidentally, a detailed description of the iris authentication will be also omitted here because the existing method can be appropriately adopted thereto. A process result of the iris authentication unit 220 is configured to be outputted to the authentication result output unit 230.

The authentication result output unit 230 integrates the result of the face authentication by the face iris authentication unit 210 and the result of the iris authentication by iris authentication unit 220, and outputs an overall authentication result that takes into account the two authentication processes. The authentication result output unit 230 outputs the authentication result (e.g., "OK" or "NG"), for example, to a not-illustrated display apparatus or the like. More specifically, for example, when the authentication results of the face authentication and the iris authentication are both "OK", the authentication result output unit 230 may output "OK" as the overall authentication result. On the other hand, when at least one of the authentication results of the face authentication and the iris authentication is "NG", the authentication result output unit 230 may output "NG" as the overall authentication result. Alternatively, the authentication result output unit 230 may calculate and output the overall authentication result on the basis of an authentication degree of each of the face authentication and the iris authentication (e.g., a numerical value of the authentication result).

(Hardware Configuration)

Figure 10:
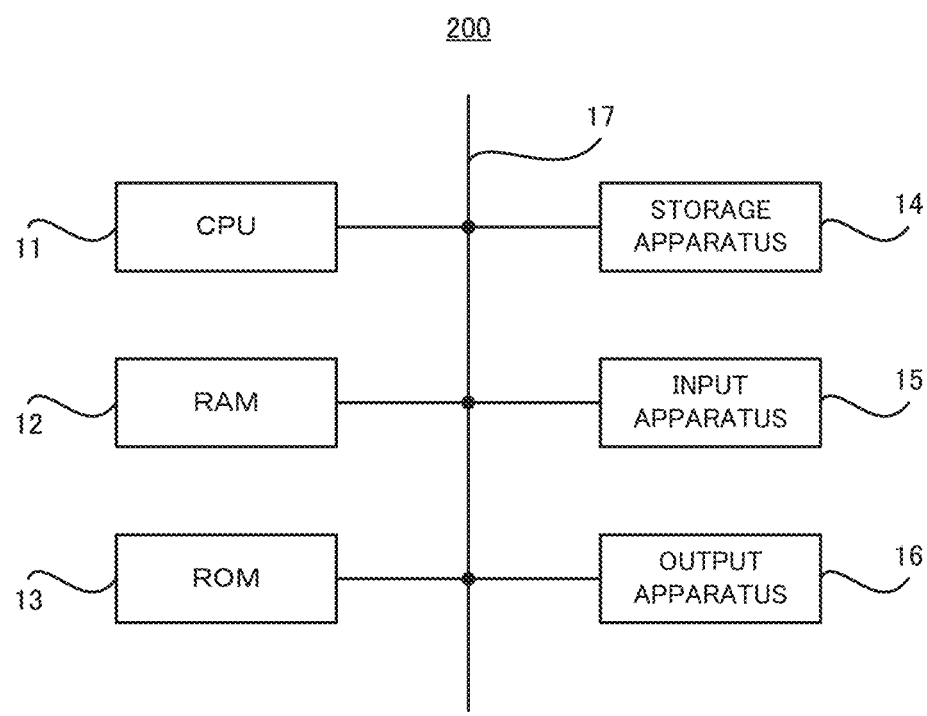
FIG. 10 is a block diagram illustrating a hardware configuration of the authentication system according to the example embodiment.

Next, a hardware configuration of the authentication system 100 (especially, the authentication processing unit 200) according to the example embodiment will be described with reference to FIG. 10. FIG. 10 is a block diagram illustrating the hardware configuration of the authentication system according to the example embodiment.

As illustrated in FIG. 10, the authentication processing unit 200 provided by the authentication system 100 according to the example embodiment includes a CPU (Central Processing Unit) 11, a RAM (Random Access Memory) 12, a ROM (Read Only Memory) 13, a storage apparatus 14, an input apparatus 15, and an output apparatus 16. The CPU 11, the RAM 12, the ROM 13, the storage apparatus 14, the input apparatus 15, and the output apparatus 16 are connected through a data bus 17.

The CPU 11 reads a computer program. For example, the CPU 11 may read a computer program stored by at least one of the RAM 12, the ROM 13 and the storage apparatus 14. For example, the CPU 11 may read a computer program stored in a computer readable recording medium, by using a not-illustrated recording medium read apparatus. The CPU 11 may obtain (i.e., read) a computer program from a not-illustrated apparatus disposed outside the authentication processing unit 200, through a network interface. The CPU 11 controls the RAM 12, the storage apparatus 14, the input apparatus 15, and the output apparatus 16 by executing the read computer program. Especially in the example embodiment, when the CPU 11 executes the read computer program, a functional block for performing the authentication process is implemented in the CPU 11. In other words, the CPU 11 is configured to function as a controller for performing the authentication process.

The RAM 12 temporarily stores the computer program to be executed by the CPU 11. The RAM 12 temporarily stores the data that is temporarily used by the CPU 11 when the CPU 11 executes the computer program. The RAM 12 may be, for example, a D-RAM (Dynamic RAM).

The ROM 13 stores the computer programs to be executed by the CPU 11. The ROM 13 may otherwise store fixed data. The ROM 13 may be, for example, a P-ROM (Programmable ROM).

The storage apparatus 14 stores the data that is stored for a long term by the authentication processing unit 200. The storage apparatus 14 may operate as a temporary storage apparatus of the CPU 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the authentication processing unit 200. The input apparatus 15 may include, for example, at least one of a keyboard, a mouse, a touch panel, a smart phone, and a tablet.

The output apparatus 16 is an apparatus that outputs information about the authentication processing unit 200 to the outside. For example, the output apparatus 16 may be a display apparatus (e.g., a display) that is configured to display the information about the authentication processing unit 200.

(Operation in Authentication)

Figure 11:
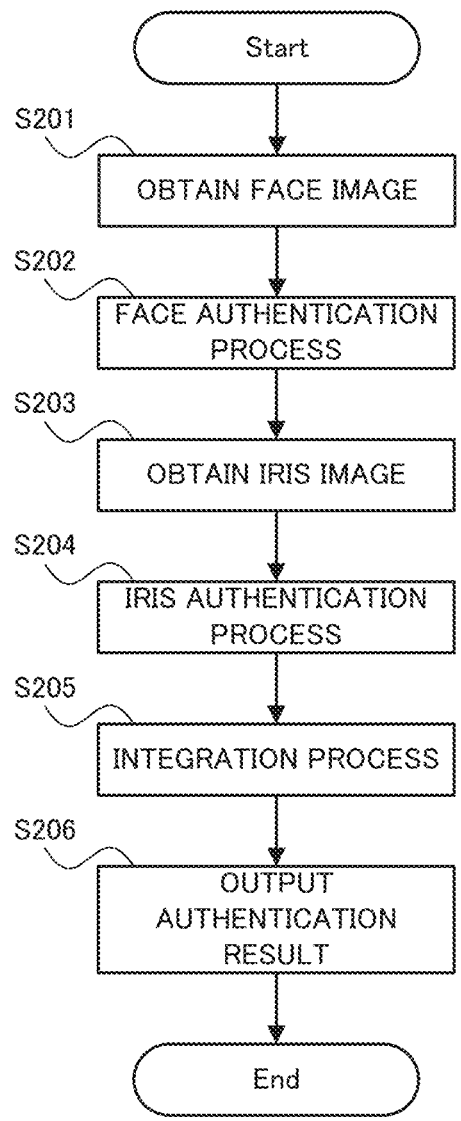
FIG. 11 is a flowchart illustrating a flow of operation of the authentication system according to the example embodiment.

Next, a flow of operation of the authentication system 100 according to the example embodiment will be described with reference to FIG. 11. FIG. 11 is a flowchart illustrating the flow of the operation of the authentication system according to the example embodiment.

As illustrated in FIG. 11, in operation of the authentication system 100 according to this example embodiment, first, the face authentication unit 210 obtains the face image of a user from the face camera 10 (step S201), and performs the face authentication process (step S202). Subsequently, the iris authentication unit 220 obtains the iris image of the user from the iris camera 20 (step S203) and performs the iris authentication process (step S204). Incidentally, the iris image obtained here is captured after the imaging range of the iris camera 20 is adjusted (i.e., after the motor 70 is driven), as described above. Therefore, the user's iris is properly imaged, and it is possible to perform the iris authentication process certainly and with high accuracy.

Then, the authentication result output unit 230 integrates the process results of the face authentication unit 210 and the iris authentication unit 220 (step S205), and outputs the overall authentication result (step S206). As described above, according to the authentication system 100 in the example embodiment, it is possible to perform a complex authentication process using both the face authentication and the iris authentication.

Technical Effects

Lastly, technical effects obtained by the authentication system 100 and the imaging apparatus 1 for authentication according to the example embodiment will be described.

As described in FIG. 1 to FIG. 8B, in the imaging apparatus 1 for authentication according to the example embodiment, the face camera 10 and the iris camera 20 are integrally driven, so that their imaging ranges can be adjusted collectively. Therefore, it is possible to simplify the apparatus configuration and to miniaturize the apparatus, as compared to that when the face camera 10 and the iris camera 20 are separately driven. Furthermore, since the iris authentication requires a higher definition image than the face authentication does, it is hard to respond to that by widening the imaging range of the iris camera 20. In the example embodiment, however, since the imaging range of the iris camera 20 is adjusted on the basis of the face position detected from the face image, even a relatively inexpensive camera (e.g., a camera having a lower pixel number) allows the iris authentication to be performed with high accuracy.

Furthermore, as described in FIG. 9 to FIG. 11, since the authentication system 100 according to the example embodiment is allowed to perform the complex authentication using the two types of biometric authentication processes, the authentication can be performed with higher accuracy even when a physical feature with an individual difference is used. In addition, since respective images can be obtained from the face camera 10 and the iris camera 20 that are integrally driven, the authentication can be performed in a short time. The authentication system 100 according to the example embodiment can be applied to, for example, person authentication in settlement at a store register or in a cash transaction at an ATM, person authentication in unlocking when entering an apartment, a private house, or a guest room of a hotel, person authentication of a driver of a company car, a truck, a bus or the like, face key entry of an automobile, and the like.

In the above-described example embodiment, an example in which the face authentication and the iris authentication are combined is described, but the authentication system 100 according to the example embodiment can be also applied to another complex authentication process. Specifically, if it is an authentication process using a plurality of living body parts in which their positional relation can be provided in advance, then, it is possible to apply the authentication system 100 according to the example embodiment. For example, the authentication system 100 can be applied to an authentication process that uses the face authentication and ear authentication in a complex manner.

<Supplementary Notes>

With respect to the example embodiment described above, the following Supplementary Notes will be further disclosed.

(Supplementary Note 1)

An imaging apparatus for authentication described in Supplementary Note 1 includes: a first imaging unit that obtains a first image used in a first authentication process by imaging a target person; a second imaging unit that obtains a second image used in a second image process by imaging the target person in an imaging range narrower than that of the first imaging unit; a drive unit that integrally drives the first imaging unit and the second imaging unit; and a drive control unit that controls the drive unit on the basis of the first image.

(Supplementary Note 2)

An imaging apparatus for authentication described in Supplementary Note 2 is the imaging apparatus for authentication described in Supplementary Note 1, wherein the (drive?) control unit detects a position of a first part in a living body of the target person from the first image, and controls the drive unit such that a second part included in the first part is included in the imaging range of the second imaging unit on the basis of the position of the first part.

(Supplementary Note 3)

An imaging apparatus for authentication described in Supplementary Note 3 is the imaging apparatus for authentication described in Supplementary Note 2, wherein the first part is a face of the target person, and the second part is an iris of the target person.

(Supplementary Note 4)

An imaging apparatus for authentication described in Supplementary Note 4 is the imaging apparatus for authentication described in any one of Supplementary Notes 1 to 3, wherein the drive unit drives the first imaging unit and the second imaging unit to rotate coaxially.

(Supplementary Note 5)

An imaging apparatus for authentication described in Supplementary Note 5 is the imaging apparatus for authentication described in Supplementary Note 4, wherein the first imaging unit and the second imaging unit are disposed inside a cylindrical housing, and the drive unit drives the first imaging unit and the second imaging unit to rotate around a central axis of the cylindrical housing as an axis of rotation.

(Supplementary Note 6)

An imaging apparatus for authentication described in Supplementary Note 6 is the imaging apparatus for authentication described in any one of Supplementary Notes 1 to 5, further including a cover part that at least partially covers the first imaging unit and the second imaging unit, wherein in the cover part, a transmittance of light from a side of the target person to an inside of the cover part is higher than a transmittance of light from the inside of the cover part to the side of the target person.

(Supplementary Note 7)

An imaging apparatus for authentication described in Supplementary Note 7 is the imaging apparatus for authentication described in any one of Supplementary Notes 1 to 6, further including a lighting unit that applies light that becomes illumination to the target person, wherein the drive unit integrally drives the first imaging unit, the second imaging unit and the lighting unit.

(Supplementary Note 8)

An imaging apparatus for authentication described in Supplementary Note 8 is the imaging apparatus for authentication described in Supplementary Note 7, wherein the lighting unit applies near-infrared light.

(Supplementary Note 9)

An imaging apparatus for authentication described in Supplementary Note 9 is the imaging apparatus for authentication described in Supplementary Note 8, wherein the lighting unit has a visible light filter having a low transmittance of visible light.

(Supplementary Note 10)

An authentication system described in Supplementary Note 10 includes: a first imaging unit that obtains a first image used in a first authentication process by imaging a target person; a second imaging unit that obtains a second image used in a second image process by imaging the target person in an imaging range narrower than that of the first imaging unit; a drive unit that integrally drives the first imaging unit and the second imaging unit; a drive control unit that controls the drive unit on the basis of the first image; a first processing unit that performs the first authentication process by obtaining the first image; a second processing unit that performs the second authentication process by obtaining the second image; and an output unit that outputs an authentication result of the target person on the basis of a processing result of the first processing unit and the second processing unit.

The present invention is not limited to the examples described above and is allowed to be changed, if desired, without departing from the essence or spirit of the invention which can be read from the claims and the entire specification. An imaging apparatus for authentication and an authentication system with such modifications are also intended to be within the technical scope of the present invention.

DESCRIPTION OF REFERENCE CODES

1 Imaging apparatus for authentication
10 Face camera
20 Iris camera
25 Camera unit
30 Lighting unit
35 Visible light filter
50 Holding part
60 Air cooling fan
70 Motor
75 Fixed part
80 Housing 100 Authentication system
200 Authentication processing unit
210 Face authentication unit
220 Iris authentication unit
230 Authentication result output unit

What is claimed is:

1. An imaging apparatus for authentication comprising:
a first imaging unit that obtains a first image used in a first authentication process by imaging a target person;
a second imaging unit that obtains a second image used in a second image process by imaging the target person in an imaging range narrower than that of the first imaging unit,
wherein the first imaging unit and the second imaging unit are disposed inside a housing;
a drive unit that integrally drives the first imaging unit and the second imaging unit to rotate around a central axis of the housing as an axis of rotation;
at least one memory storing instructions; and
at least one processor that is configured to execute instructions to control the drive unit on the basis of the first image.

2. The imaging apparatus for authentication according to claim 1, wherein the processor detects a position of a first part in a living body of the target person from the first image, and controls the drive unit such that a second part included in the first part is included in the imaging range of the second imaging unit on the basis of the position of the first part.

3. The imaging apparatus for authentication according to claim 2, wherein
the first part is a face of the target person, and
the second part is an iris of the target person.

4. The imaging apparatus for authentication according to claim 1, wherein the drive unit drives the first imaging unit and the second imaging unit to rotate coaxially.

5. The imaging apparatus for authentication according to claim 1, further comprising a cover part that at least partially covers the first imaging unit and the second imaging unit, wherein
in the cover part, a transmittance of light from a side of the target person to an inside of the cover part is higher than a transmittance of light from the inside of the cover part to the side of the target person.

6. The imaging apparatus for authentication according to claim 1, further comprising a lighting unit that applies light that becomes illumination to the target person, wherein the drive unit integrally drives the first imaging unit, the second imaging unit and the lighting unit.

7. The imaging apparatus for authentication according to claim 6, wherein the lighting unit applies near-infrared light.

8. The imaging apparatus for authentication according to claim 7, wherein the lighting unit has a visible light filter having a low transmittance of visible light.

9. An authentication system comprising:
a first imaging unit that obtains a first image used in a first authentication process by imaging a target person;
a second imaging unit that obtains a second image used in a second image process by imaging the target person in an imaging range narrower than that of the first imaging unit,
wherein the first imaging unit and the second imaging unit are disposed inside a housing;
a drive unit that integrally drives the first imaging unit and the second imaging unit to rotate around a central axis of the housing as an axis of rotation;
at least one memory storing instructions; and
at least one processor that is configured to execute instructions to:
control the drive unit on the basis of the first image;
perform the first authentication process by obtaining the first image;
perform the second authentication process by obtaining the second image; and
output an authentication result of the target person on the basis of a processing result of the processor.

10. The imaging apparatus for authentication according to claim 2, wherein the first imaging unit captures the first image again and the second imaging unit captures the second image, after the processor controls the drive unit such that the second part is included in the imaging range of the second imaging unit.

11. The imaging apparatus for authentication according to claim 4, wherein
the first imaging unit and the second imaging unit are disposed inside a cylindrical housing, and
the drive unit drives the first imaging unit and the second imaging unit to rotate around a central axis of the cylindrical housing as an axis of rotation.

* * * * *